(12) United States Patent
Zinnecker et al.

(10) Patent No.: US 11,274,734 B2
(45) Date of Patent: Mar. 15, 2022

(54) BALL SCREW WITH RETAINING DEVICE

(71) Applicant: Schaeffler Technologies AG & Co. KG, Herzogenaurach (DE)

(72) Inventors: Michael Zinnecker, Berkley, MI (US); Renato de Paula, Sterling Heights, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/798,699

(22) Filed: Feb. 24, 2020

(65) Prior Publication Data
US 2021/0262555 A1 Aug. 26, 2021

(51) Int. Cl.
*F16H 25/22* (2006.01)
*F16H 25/24* (2006.01)

(52) U.S. Cl.
CPC ..... *F16H 25/2427* (2013.01); *F16H 25/2233* (2013.01)

(58) Field of Classification Search
CPC ......... F16H 2025/2463; F16H 25/2214; F16H 25/2238; F16H 25/2209; F16H 25/2233; F16H 25/2427; F16D 2125/40
See application file for complete search history.

(56) References Cited

U.S. PATENT DOCUMENTS

| | | | | |
|---|---|---|---|---|
| 8,671,789 B2 * | 3/2014 | Osterlaenger | ....... | F16H 25/2233 74/89.42 |
| 8,875,851 B2 * | 11/2014 | Winkler | .............. | F16H 25/2233 188/106 F |
| 9,593,752 B2 * | 3/2017 | Adler | ...................... | F16D 65/18 |
| 2015/0330487 A1 * | 11/2015 | Wilhelm | ............. | F16H 25/2233 188/72.8 |
| 2018/0017147 A1 * | 1/2018 | Kreutzer | ............. | F16H 25/2223 |
| 2020/0141475 A1 * | 5/2020 | Aramoto | ............. | F16H 25/2238 |

FOREIGN PATENT DOCUMENTS

| | | | | |
|---|---|---|---|---|
| DE | 102008032819 A1 * | 2/2009 | ............. | F16D 65/18 |
| DE | 102007042654 A1 * | 3/2009 | ............. | F16D 65/56 |
| DE | 102017108370 A1 * | 10/2018 | ......... | F16H 25/2233 |
| DE | 102017108896 A1 | 10/2018 | | |
| WO | WO-2018192600 A1 * | 10/2018 | ......... | F16H 25/2233 |

* cited by examiner

*Primary Examiner* — Jake Cook
*Assistant Examiner* — Gregory Robert Weber
(74) *Attorney, Agent, or Firm* — Volpe Koenig

(57) ABSTRACT

A ball screw, including: a spindle supported for rotation around an axis of rotation; a ball nut radially disposed around the spindle, axially displaceable with respect to the spindle, and including a helical protrusion, the helical protrusion defining a helical groove; a plurality of balls disposed in the helical groove and in contact with the spindle; a reset spring including a portion located in the helical groove and an end portion extending past the helical groove in a circumferential direction around the axis of rotation; and a retaining device directly connected to the ball nut and arranged to limit displacement of the end portion of the reset spring in a first axial direction parallel to the axis of rotation. For a first circumferential position of the spindle around the axis of rotation, the reset spring urges the plurality of balls in a second axial direction, opposite the first axial direction.

20 Claims, 11 Drawing Sheets

BALL SCREW WITH RETAINING DEVICE

TECHNICAL FIELD

The preset disclosure relates to a ball screw with a retaining device to block axial displacement of an end portion of a reset spring for the ball screw.

BACKGROUND

For a known ball screw, an end portion of a reset spring is unrestrained in an axial direction. For quicker and more dynamic actuation speeds, the end portion of the reset spring can axially displace, resulting in failure of the reset spring and subsequent failure of the ball screw.

SUMMARY

According to aspects illustrated herein, there is provided a ball screw, including: a spindle supported for rotation around an axis of rotation; a ball nut radially disposed around the spindle and including a first helical protrusion, the first helical protrusion defining a first helical groove in the ball nut; a plurality of balls disposed in the first helical groove and in contact with the spindle; a reset spring directly engaged with the plurality of balls, including a first portion located in the first helical groove, and including an end portion with an end surface facing at least partly in a first circumferential direction around the axis of rotation, the end surface directly engaged with the ball nut; and a retaining device directly connected to the ball nut, including a circumferential end located past the end surface of the reset spring in a first axial direction parallel to the axis of rotation, and arranged to limit displacement of the end portion of the reset spring in the first axial direction. No portion of the first helical protrusion is disposed between the end portion of the reset spring and the circumferential end of the retaining device in the first axial direction.

According to aspects illustrated herein, there is provided a ball screw, including: a spindle; a ball nut radially disposed around the spindle, axially displaceable with respect to the spindle, and including a first helical protrusion, the first helical protrusion defining a first helical groove in the ball nut; a plurality of balls disposed in the first helical groove and in contact with the spindle; a reset spring including a first portion located in the first helical groove and an end portion extending past the first helical groove in a first circumferential direction around the axis of rotation; and a retaining device directly connected to the ball nut and limiting displacement of the end portion of the reset spring in a first axial direction parallel to the axis of rotation. For a first circumferential position of the spindle around the axis of rotation, the reset spring urges the plurality of balls in a second axial direction, opposite the first axial direction.

According to aspects illustrated herein, there is provided a ball screw, including: a spindle supported for rotation around an axis of rotation; a ball nut radially disposed around the spindle, axially displaceable with respect to the spindle, and including a helical protrusion, the helical protrusion defining a helical groove in the ball nut and including an end forming a portion of the helical protrusion extending furthest in a first axial direction parallel to the axis of rotation; a plurality of balls disposed in the helical groove and in contact with the spindle; a reset spring located in the helical groove and including an end portion forming a portion of the reset spring extending furthest in the first axial direction, the end portion extending past the end of the helical groove in the first circumferential direction and including an end surface, the end surface facing at least partly in a first circumferential direction around the axis of rotation and directly engaged with the ball nut; and a retaining device axially fixed to the ball nut, extending past the end of the helical protrusion in the first circumferential direction, and located past the end portion of the reset spring in the first axial direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the preset disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
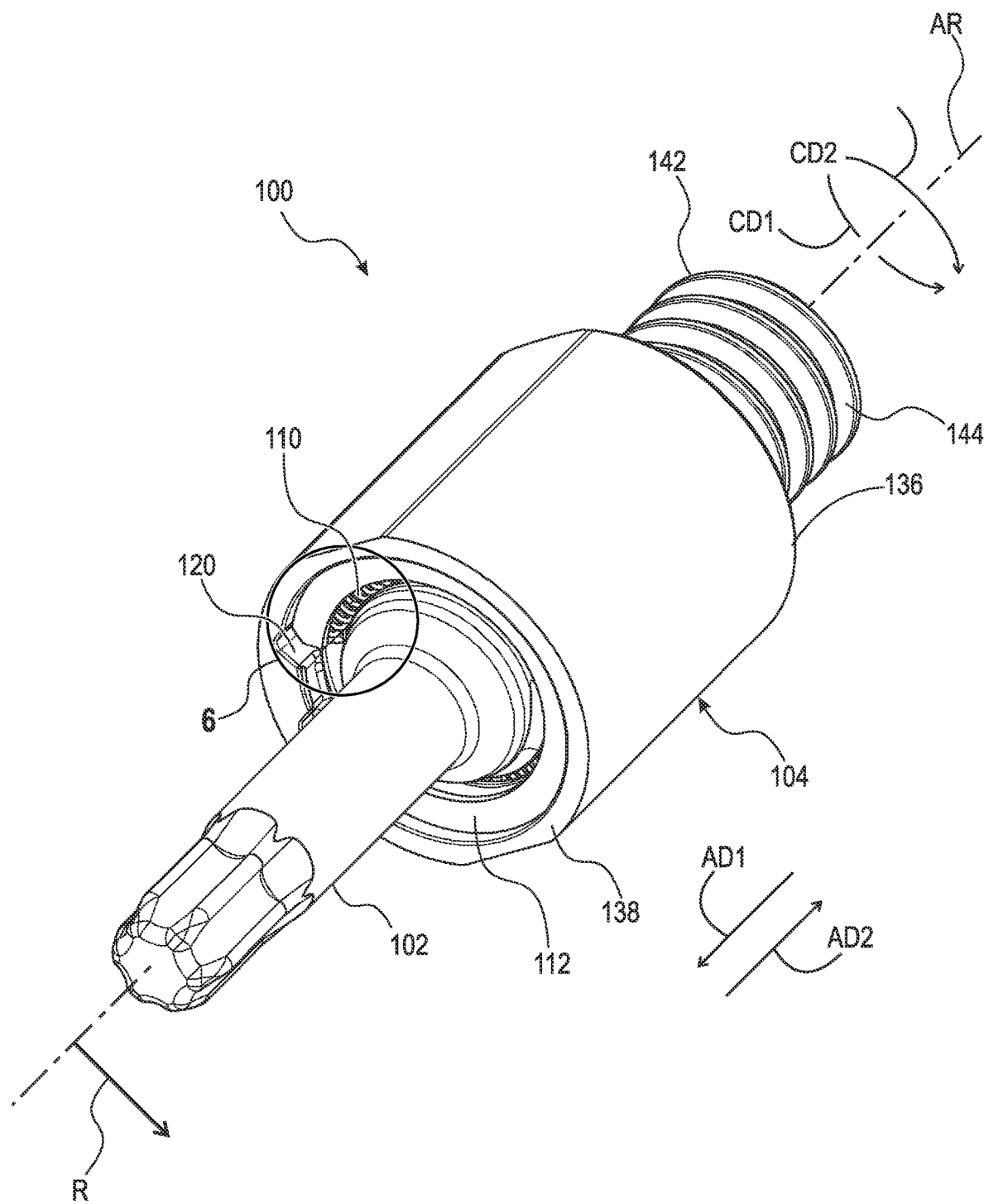
FIG. 1 is a front isometric view of a ball screw, with a retaining device and a reset spring uncompressed.

FIG. 1 is a front isometric view of ball screw 100, with a retaining device and a reset spring uncompressed.

Figure 2:
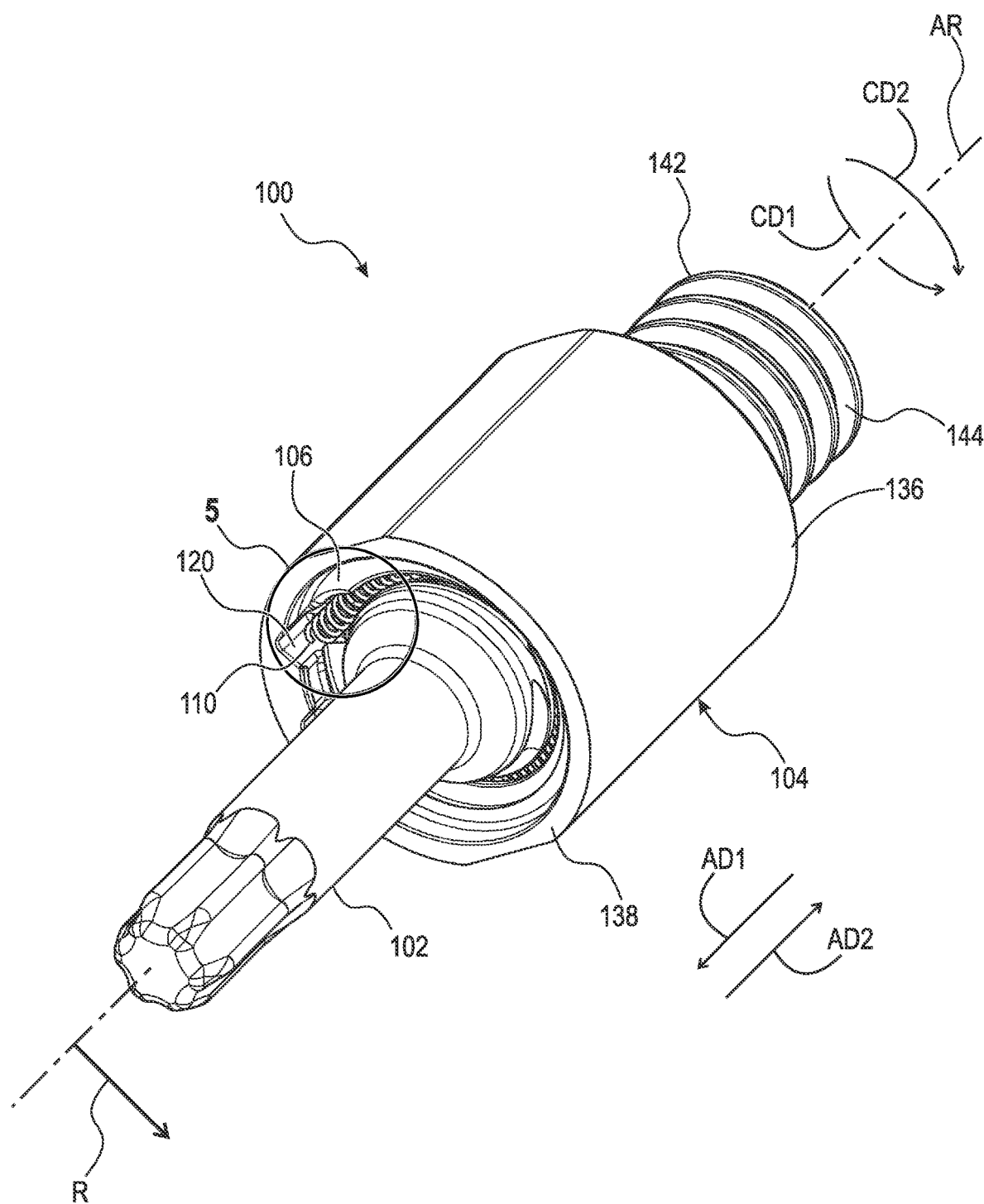
FIG. 2 is a front view of the ball screw shown in FIG. 1 with the retaining device removed.

FIG. 2 is a front view of ball screw 100 shown in FIG. 1 with the retaining device removed.

Figure 3:
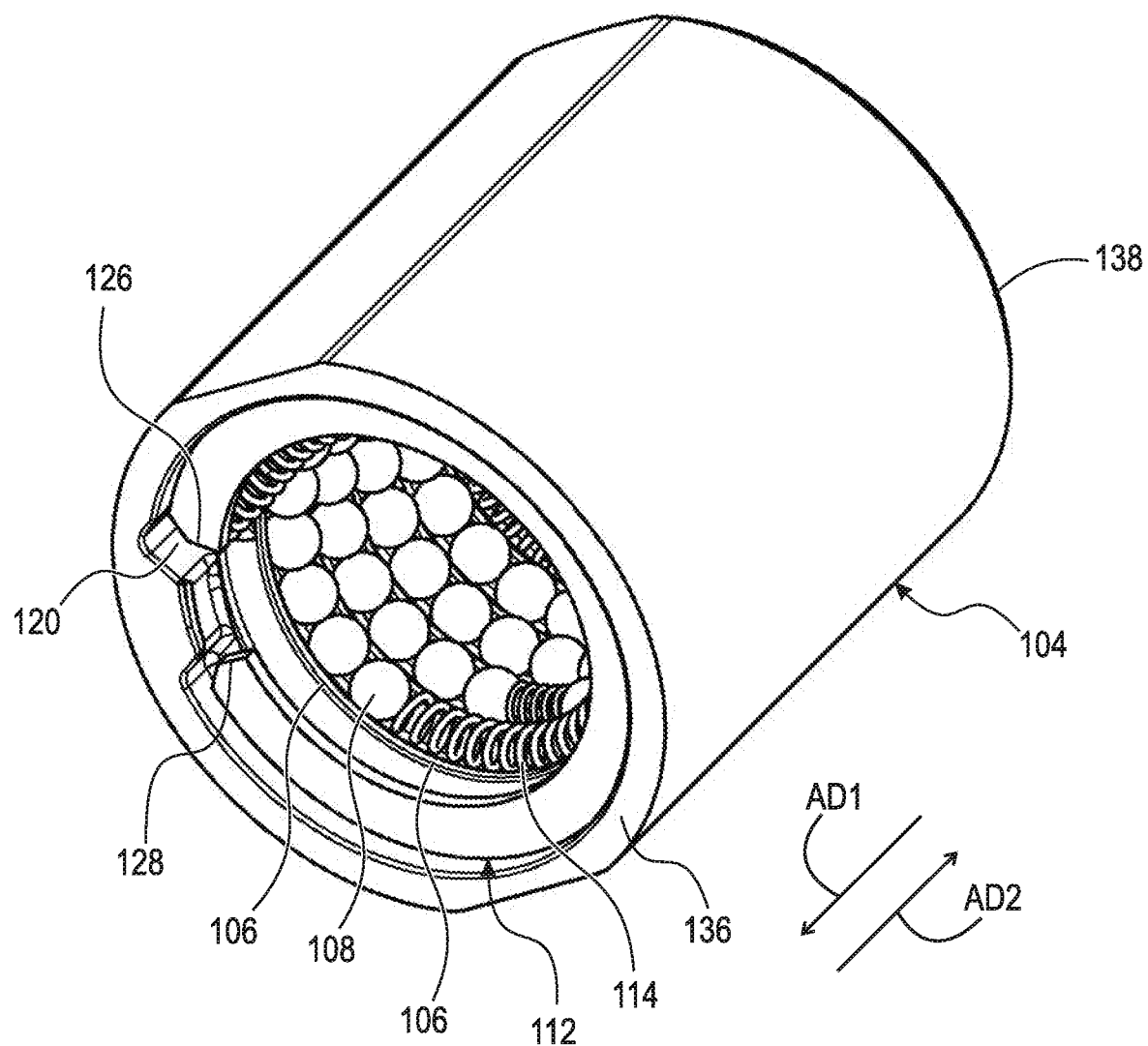
FIG. 3 is an isometric view of the ball screw in FIG. 1 with a spindle removed.

FIG. 3 is an isometric view of ball screw 100 in FIG. 1 with a spindle removed.

Figure 4:
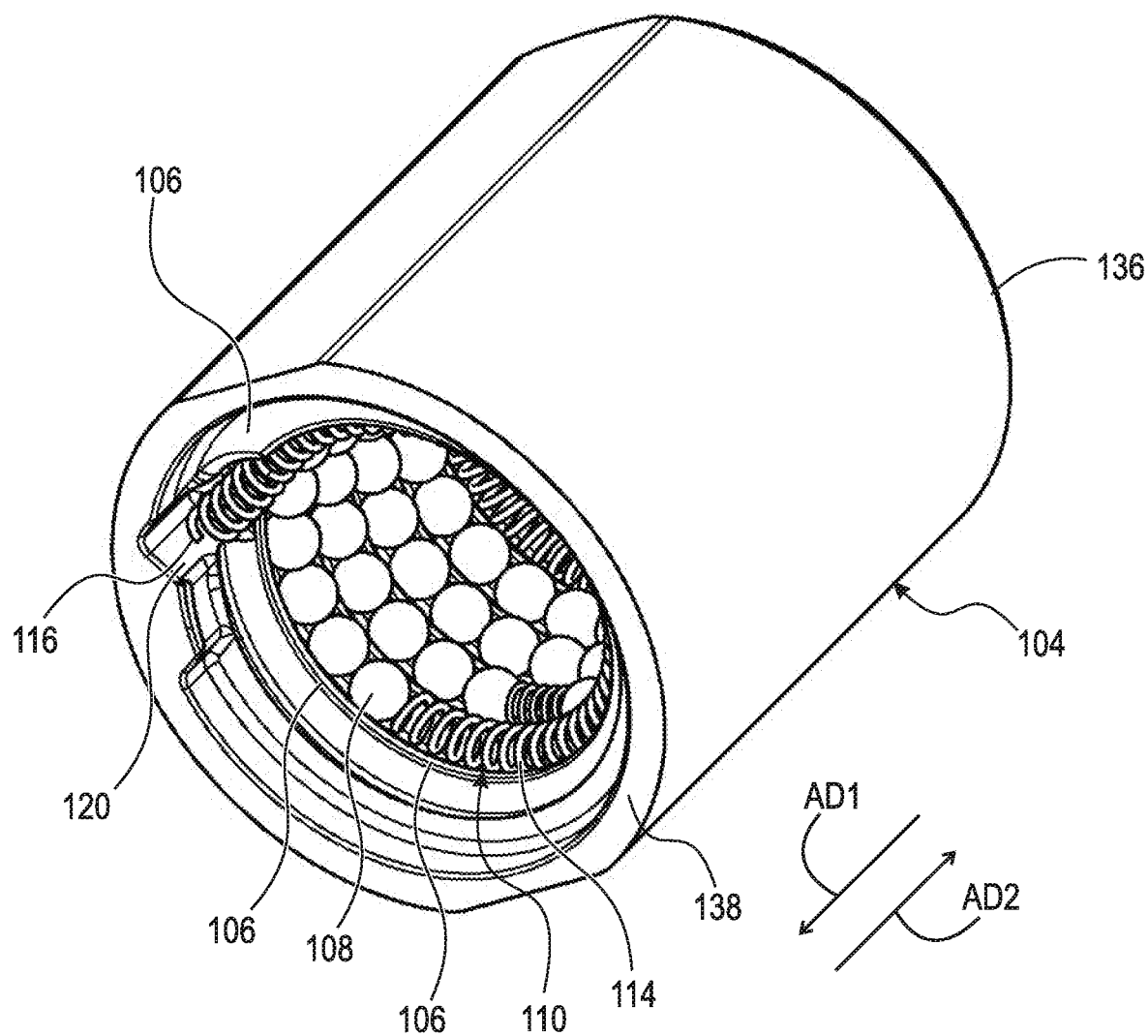
FIG. 4 is an isometric view of the ball screw in FIG. 2 with the spindle removed.

FIG. 4 is an isometric view of ball screw 100 in FIG. 2 with the spindle removed.

Figure 5:
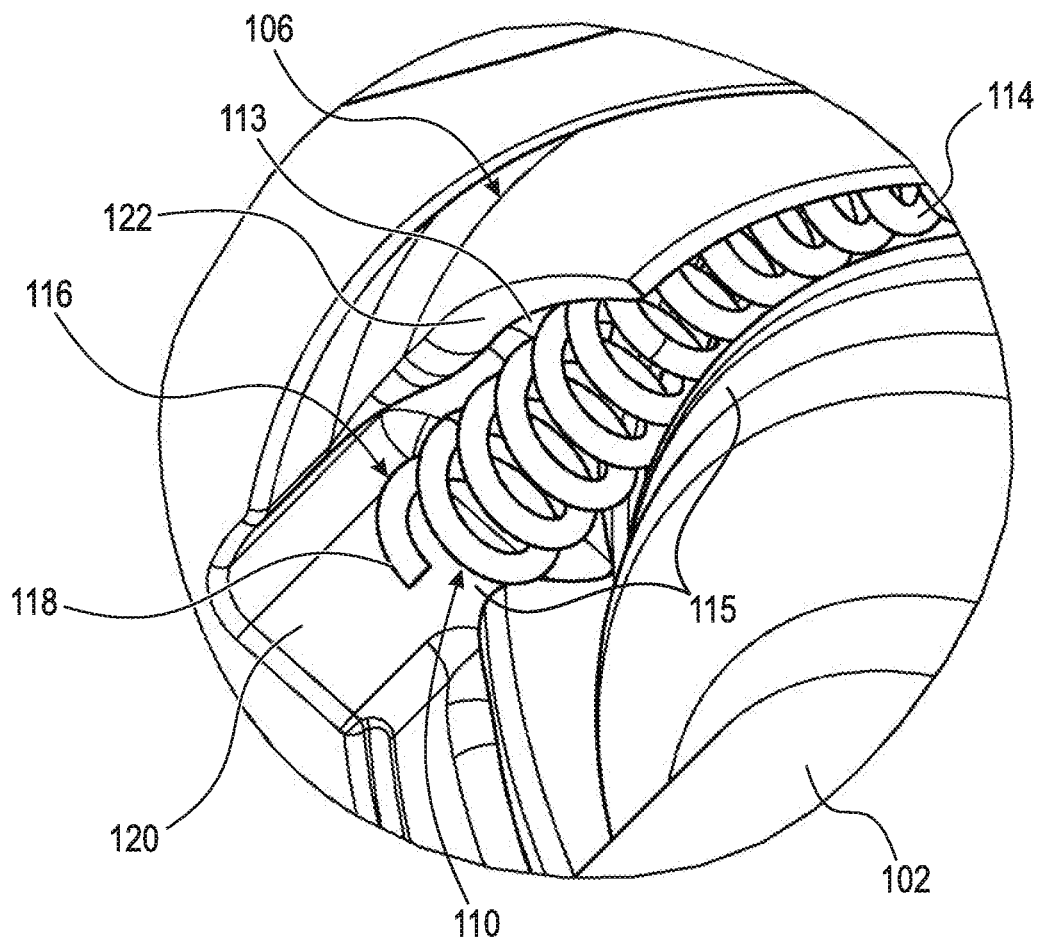
FIG. 5 is a detail of area 5 in FIG. 2.

FIG. 5 is a detail of area 5 in FIG. 2. The following should be viewed in light of FIGS. 1 through 5. Ball screw 100 includes: spindle 102; ball nut 104 radially disposed around spindle 102 and including helical protrusion, or thread, 106; balls 108; reset spring 110; and retaining device 112. Helical protrusion 106 defines helical groove 113 in ball nut 104.

Balls 108 are disposed in helical groove 113 and are in contact with spindle 102. Portion 114 of reset spring 110 is located in helical groove 113.

In an example embodiment, spindle 102 is supported for rotation around axis of rotation AR and ball screw 100 converts rotary motion of spindle 102 into displacement of ball nut 104, with respect to spindle 102, in opposite axial directions AD1 and AD2 parallel to axis of rotation AR.

In an example embodiment, ball nut 104 is supported for rotation around axis of rotation AR and ball screw 100 converts rotary motion of ball nut 104 into displacement of spindle 102, with respect to ball nut 104, in axial directions AD1 and AD2.

Retaining device 112 is separately formed from ball nut 104, that is device 112 and nut 104 are separate components, or units, of ball screw 100. Retaining device 112 is directly connected to ball nut 104, and is arranged to at least limit displacement of end portion 115 of reset spring 110 in axial direction AD1. As further described below, end portion 115 extends past retaining device 112 in circumferential direction CD1 around axis AR. Circumferential direction CD1, and opposite circumferential direction CD2, are illustrated by an end point of radius R rotated counter clock-wise and clock-wise, respectively around axis AR.

Figure 6:
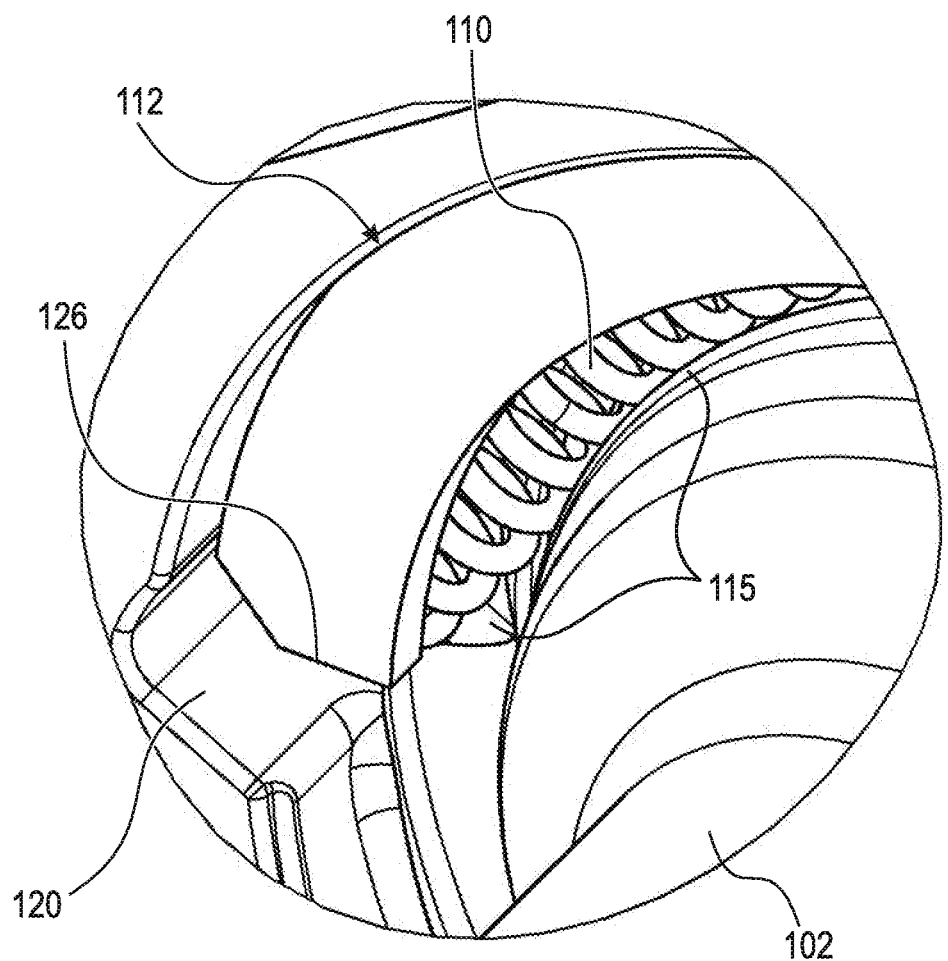
FIG. 6 is a detail of area 6 in FIG. 1.

FIG. 6 is a detail of area 6 in FIG. 1.

Figure 7:
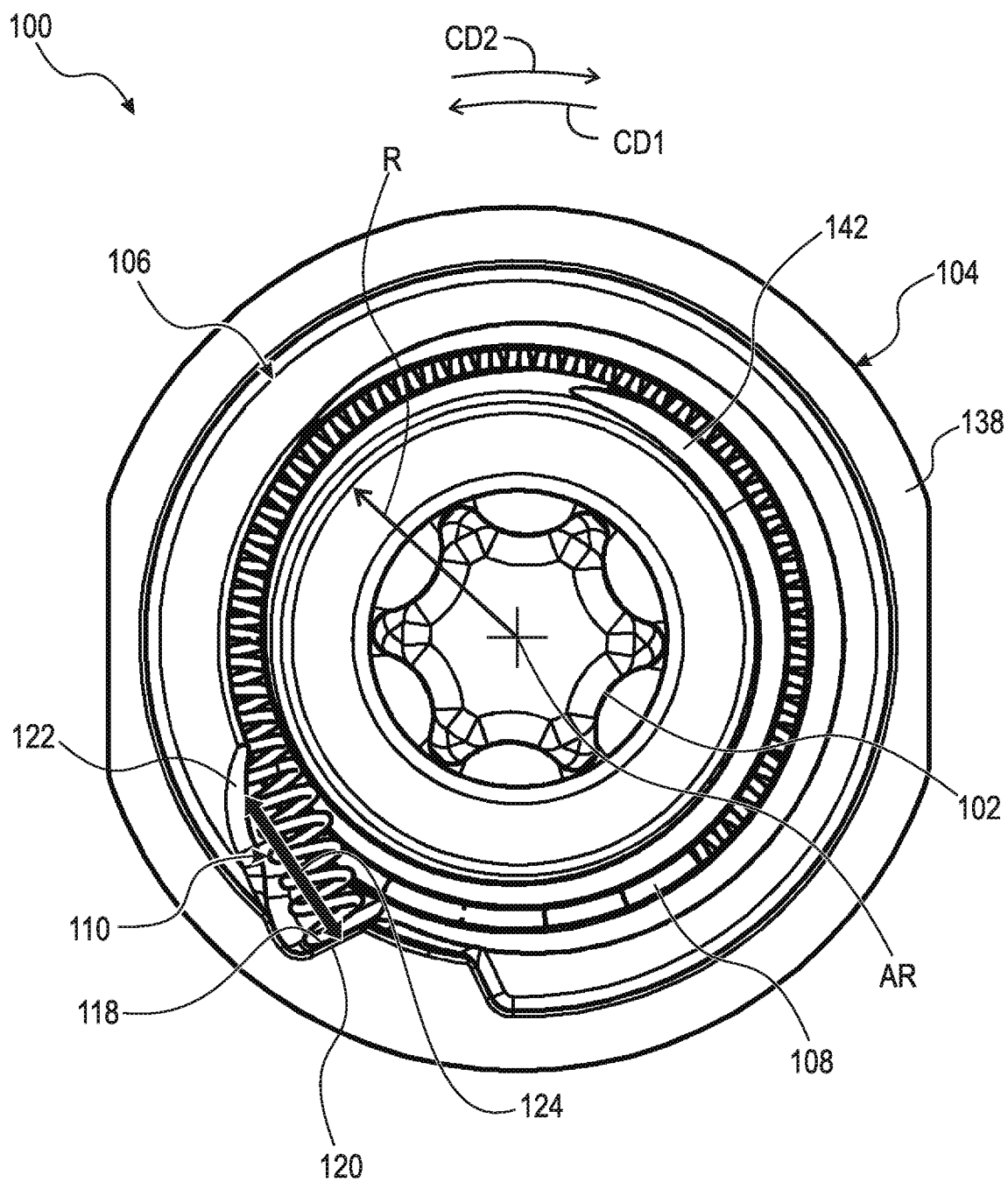
FIG. 7 is a front view of the ball screw shown in FIG. 2.

FIG. 7 is a front view of ball screw 100 shown in FIG. 2.

Figure 8:
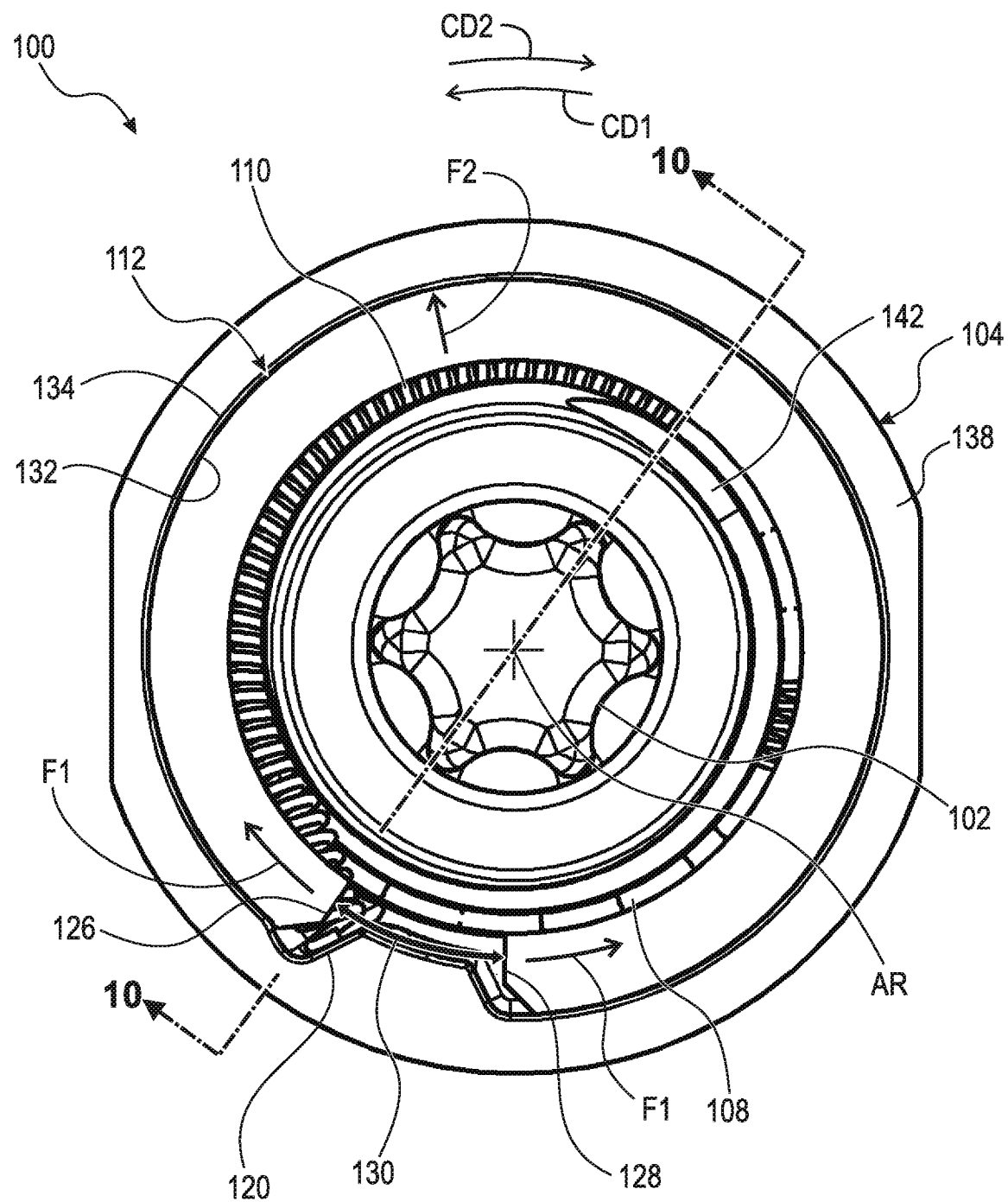
FIG. 8 is a front view of the ball screw shown in FIG. 2 with the reset spring compressed.

FIG. 8 is a front view of ball screw 100 shown in FIG. 2 with spring 110 compressed. The following should be viewed in light of FIGS. 1 through 8 and is directed to an example embodiment in which spindle 102 is rotated to axially displace ball nut 104. FIGS. 1 through 7 depict ball screw 100 in an uncompressed mode, in which spindle 102 is in a first circumferential position around axis of rotation AR. In the uncompressed mode, spring 110 is uncompressed. FIG. 8 depicts ball screw 100 in a compressed mode, in which spindle 102 has been rotated to a second circumferential position around axis of rotation AR and spring 110 is compressed. In the compressed mode, reset spring 110 urges balls 108 along helical protrusion 106 and through helical groove 113 in axial direction AD2 and in circumferential direction CD2. In the uncompressed mode, spring 110 resists displacement of balls 108 along helical protrusion 106 and through helical groove 113 in axial direction AD1 and in circumferential direction CD1.

Portion 115 includes circumferential end 116 with circumferential end surface 118. Surface 118: faces at least partly in direction CD1; is directly engaged with ball nut 104, for example surface 120 of ball nut 104; is located past helical protrusion 106 in axial direction AD1; and is located past retaining device 112 in axial direction AD2. Surface 120 faces at least partly in circumferential direction CD2. No portion of protrusion 106 is axially disposed between device 112 and portion 115. Ball nut 104 supports reset spring 110 in direction CD1. In the example uncompressed mode of FIGS. 1 through 7, ball nut 104 fails to support end portion 115 in direction AD1. That is, in the example uncompressed mode of FIGS. 1 through 7, end portion 115 is free of support from ball nut 104 in direction AD1.

By one component "directly engaged with" another component, we mean that the components are in direct contact, or that the components are each in direct contact with one or more ancillary intermediate parts, for example, a cap fixed to an end of a spring, such that the components and the ancillary parts are mechanically solid at the points of contact with the one or more ancillary intermediate parts.

As further described below: in the compressed mode, reset spring 110 reacts against surface 120 to urge balls 108 balls in axial direction AD2 and circumferential direction CD2; and in the uncompressed mode, reset spring 110 reacts against surface 120 to resist displacement of balls 108 balls in axial direction AD1 and circumferential direction CD1.

Figure 9:
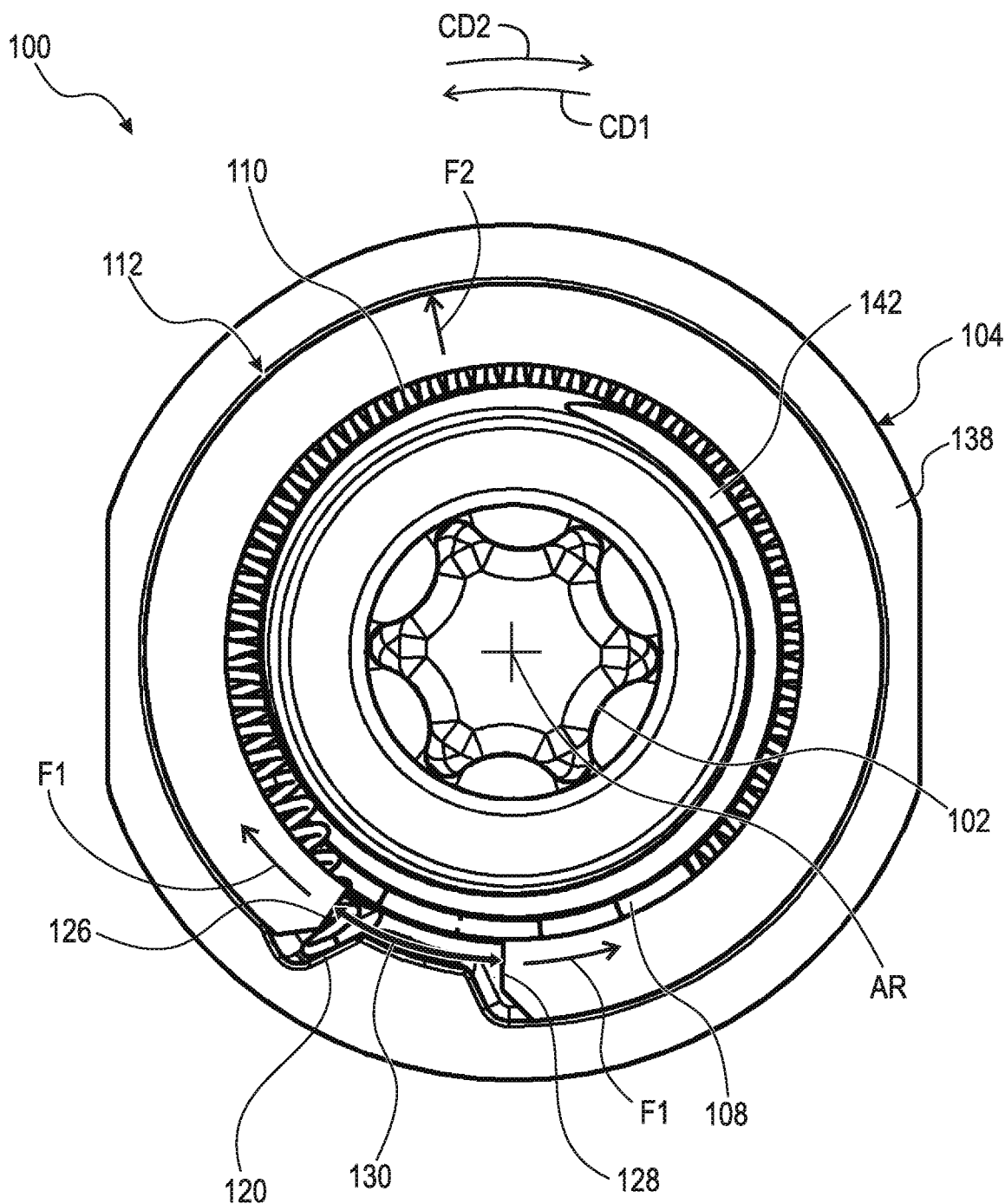
FIG. 9 is a front view of the ball screw shown in FIG. 1.

FIG. 9 is a front view of ball screw 100 shown in FIG. 1.

Figure 10:
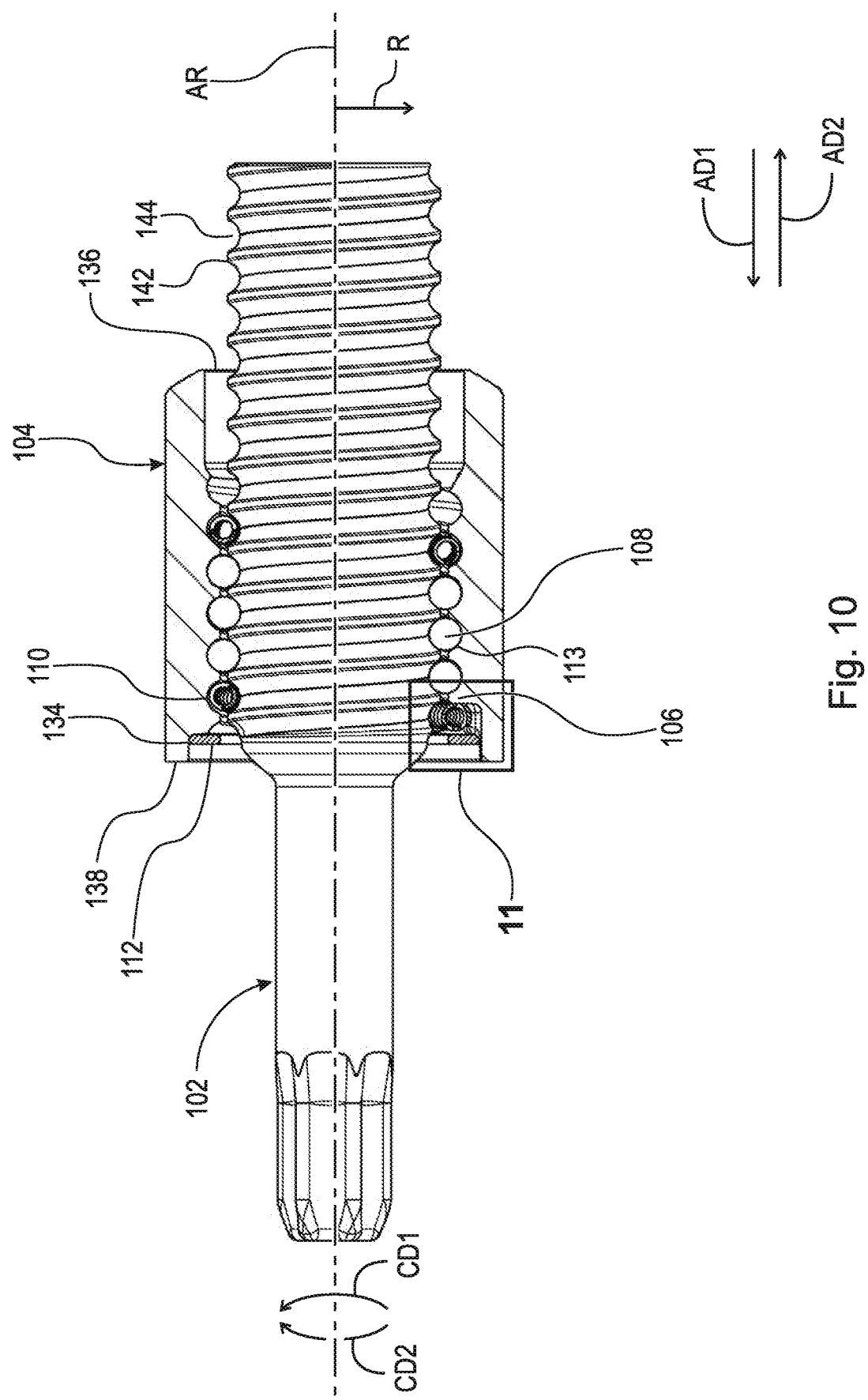
FIG. 10 is a cross-sectional view generally along line 10-10 in FIG. 8.

FIG. 10 is a cross-sectional view generally along line 10-10 in FIG. 8.

Figure 11:
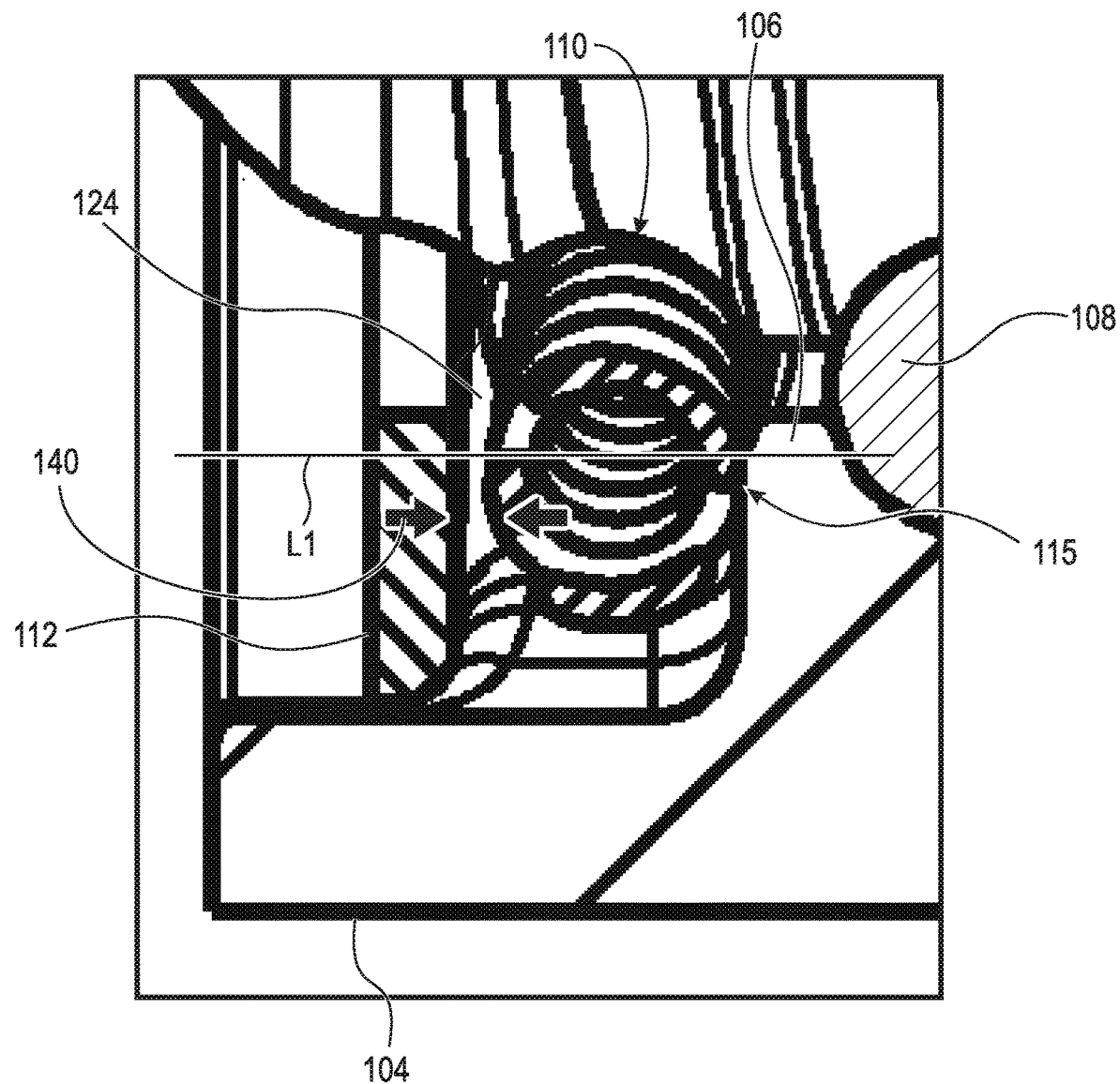
FIG. 11 is a detail of area 11 in FIG. 10.

FIG. 11 is a detail of area 11 in FIG. 10. The following should be viewed in light of FIGS. 1 through 11. Helical protrusion 106 includes end surface 122 facing at least partly in direction CD1. Surface 122 forms a portion of helical protrusion 106 extending furthest in axial direction AD1. In an example embodiment, an entirety of retaining device 112 is located past reset spring 110 in axial direction AD1. In an example embodiment, an entirety of retaining device 112 is located past helical protrusion 106, for example surface 122, in axial direction AD1. Thus, retaining device 112 overlaps end surface 122 in axial direction AD1 and extends past end surface 122 in direction CD1.

Hypothetical line L1 passes through, in sequence and axial direction AD2, retaining device 112 and portion 115 of reset spring 110, without passing through helical protrusion 106. Hypothetical line L1, passes through helical protrusion 106 after passing through portion 115.

No portion of helical protrusion 106 is located between portion 115 of reset spring 110 and retaining device 112 in axial direction AD1. End surface 122 of helical protrusion 106 is separated, in circumferential direction CD1, from surface 120 by gap 124. That is, end surface 122 and surface 120 define gap 124 in direction CD1. Retaining device 112 overlaps at least a portion of gap 124 in axial direction AD1. For example, hypothetical line L1 passes through in sequence and in axial direction AD2: retaining device 112, gap 124, and reset spring 110 without passing through protrusion 106.

In an example embodiment, no portion of retaining device 112 is located radially inward of reset spring 110. In an example embodiment, retaining device 112 is discontinuous in directions CD1 and CD2. For example: retaining device 112 includes circumferential end 126 facing at least partly in direction CD1, and circumferential end 128 facing at least partly in direction CD2; and circumferential ends 126 and 128 define gap 130 in directions CD1 and CD2. In an example embodiment, end 116 of spring 110 extends past end 126 in direction CD1.

In an example embodiment, retaining device 112 is preloaded with force F1 displacing ends 126 and 128 circumferentially away from each other and engaging outer surface 132 of retaining device 112 with step surface 134 of ball nut 104 with compressive force F2. Force F2 fixes device 112 in place. It is understood that retaining device 112 can be connected to ball nut 104 by any other means known in the art, including but not limited to disposing device 112 in a circumferential groove in surface 134 (not shown) or welding device 112 to ball nut 104 (not shown).

Ball nut 104 includes axial end 136 and opposite axial end 138. Axial direction AD1 is from end 136 toward end 138. Axial end 136, reset spring 110, retaining device 112, and axial end 138 are in sequence in axial direction AD1.

In an example embodiment, retaining device 112 and end portion 115 bound at least a portion of gap 124 in axial directions AD1 and AD2. Gap 124 is provided to limit frictional contact of spring 110 with device 112. Axial dimension 140 of gap 124 is determined such that possible displacement of portion 115 by dimension 140 in axial direction AD1, for example due to more extreme operating conditions for ball screw 100, does not result in failure of reset spring 110. In an example embodiment (not shown), retaining device 112 is in contact with end portion 115.

As is known in the art, spindle 102 includes helical protrusion, or thread, 142 defining helical groove 144. Balls 108 and portion 114 of spring 110 are disposed in groove 144.

The following discussion is directed to operation of ball screw 100. In the uncompressed mode of FIGS. 1 through 7 and 9, ball screw 100 is in a rest position, for example with no axial load (resistance to displacement in direction AD2) on ball nut 104. Ball nut 104 is displaced to a maximum extent in axial direction AD1, reset spring 110 is fully unwound, and balls 108 are in a nominal/rest position with respect to ball nut 104.

To displace ball nut 104 in direction AD2, for example to actuate a brake, spindle 102 is rotated in direction CD1. Up to a threshold load on nut 104, balls 108 and spring 110 slide as a unit through grooves 113 and 144, displacing ball nut 104 in direction AD2 without compressing spring 110. When the load on nut 104 increases beyond the threshold, balls 108 begin to roll through grooves 113 and 144, eventually compressing spring 110 as shown in FIGS. 8, 10, and 11. To return to the configuration shown in FIGS. 1 through 7 and 9, for example the brake is released, spindle 102 is rotated in direction CD2 and reset spring 110 unwinds to displace balls 108 to the desired nominal/rest position from which, for example, the brake can again be actuated.

The above discussion regarding the example embodiment in which spindle 102 is rotated to axially displace ball nut 104 is generally applicable to an example embodiment in which ball nut 104 is rotated to axially displace spindle 102 with respect to ball nut 104. In the example embodiment in which ball nut 104 is rotated to axially displace spindle 102 with respect to ball nut 104, the compression and unwinding of reset spring 110 described above is caused by rotation of ball nut 104 with respect to spindle 102.

As noted above, a quicker and more dynamic transition between the compressed mode and the uncompressed mode for ball screw 100 (compressing and unwinding spring 110 respectively) can act to displace portion 115 of spring 110 in axial direction AD1, which can displace spring 110 from grooves 113 and 144. Retaining device 112 limits or blocks the undesirable displacement of portion 115 in direction AD1. Retaining device 112 overlaps at least a portion of end portion 115 in direction AD1 and in the example of FIG. 1, limits possible displacement of end portion 115 in direction AD1 to negligible dimension 140 of gap 124. As noted above, displacement of end portion 115 in direction AD1 by dimension 140 does not compromise operation of reset spring 110 and ball screw 100.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation
CD1 circumferential direction
CD2 circumferential direction
F1 preloading force
F2 compressive force
L1 line
R radius
100 ball screw
102 spindle
104 ball nut
106 helical protrusion
108 ball
110 reset spring
112 retaining device
113 helical groove
114 portion, reset spring
115 end portion, reset spring
116 circumferential end, reset spring
118 circumferential end surface, reset spring
120 surface, ball nut
122 end surface, helical protrusion
124 gap
126 end, retaining device
128 end, retaining device
130 gap
132 outer surface, retaining device
134 step surface, ball nut
136 axial end, ball nut
138 axial end, ball nut
140 dimension, gap 124
142 helical protrusion, spindle
144 helical groove, spindle

The invention claimed is:

1. A ball screw, comprising:
a spindle supported for rotation around an axis of rotation;
a ball nut radially disposed around the spindle and including a first helical protrusion, the first helical protrusion defining a first helical groove in the ball nut;
a plurality of balls disposed in the first helical groove and in contact with the spindle;
a reset spring directly engaged with the plurality of balls, including a first portion located in the first helical groove, and including an end portion with an end surface facing at least partly in a first circumferential direction around the axis of rotation and directly engaged with the ball nut; and,
a retaining device in constant direct contact with the ball nut, including a circumferential end located past the end surface of the reset spring in a first axial direction parallel to the axis of rotation, and arranged to limit displacement of the end portion of the reset spring in the first axial direction, wherein no portion of the ball nut is disposed between the end portion of the reset spring and the circumferential end of the retaining device in the first axial direction, and wherein an entirety of the retaining device is located beyond the reset spring in the first axial direction.

2. The ball screw of claim 1, wherein:
the ball nut is a first component of the ball screw; and,
the retaining device is a second component of the ball screw, different from the first component of the ball screw.

3. The ball screw of claim 1, wherein:
the retaining device blocks displacement of the end portion of the reset spring in the first axial direction; and,
for a first circumferential position of the spindle around the axis of rotation, the reset spring urges the plurality of balls in a second axial direction, opposite the first axial direction.

4. The ball screw of claim 1, wherein a hypothetical line passes through, in sequence and in a second axial direction, opposite the first axial direction, the retaining device and the end portion of the reset spring without passing through the ball nut.

5. The ball screw of claim 4, wherein the hypothetical line passes through the first helical protrusion after passing through the end portion of the reset spring.

6. The ball screw of claim 1, wherein the end surface of the reset spring is located past the first helical protrusion in the first axial direction and is located past the retaining device in a second axial direction opposite the first axial direction.

7. The ball screw of claim 1, wherein:
the first helical protrusion includes an end surface facing at least partly in the first circumferential direction;
the ball nut includes a step surface facing at least partly in a second circumferential direction, opposite the first circumferential direction;
the end surface of the reset spring is directly engaged with the step surface;
the end surface of the first helical protrusion is separated, in the first circumferential direction, from the step surface of the ball nut by a gap; and,
the retaining device overlaps at least a portion of the gap in the first axial direction; or,
a hypothetical line passes through, in sequence and in the first axial direction, the end portion of the reset spring, the gap, and the retaining device.

8. The ball screw of claim 1, wherein:
in a first circumferential position of the spindle, the reset spring urges the plurality of balls in a second circumferential direction, opposite the first circumferential direction;
the first helical protrusion includes an end surface facing at least partly in the first circumferential direction; and,
the reset spring and the retaining device extend past the end surface of the first helical protrusion in the first circumferential direction.

9. The ball screw of claim 1, wherein no portion of the retaining device is located radially inward of the reset spring with respect to the axis of rotation.

10. The ball screw of claim 1, wherein:
in a first circumferential position of the spindle, the reset spring urges the plurality of balls in a second circumferential direction, opposite the first circumferential direction;
the retaining device includes an end surface facing at least partly in the first circumferential direction; and,
the end surface of the reset spring is located past the end surface of the retaining device in the first circumferential direction.

11. The ball screw of claim 1, wherein:
the spindle includes a second helical protrusion defining a second helical groove; and,
the plurality of balls and the first portion of the reset spring are disposed in the second helical groove.

12. The ball screw of claim 1, wherein:
the ball nut supports the reset spring in the first circumferential direction; and,
the end portion of the reset spring is free of support from the ball nut in the first axial direction.

13. The ball screw of claim 1, wherein:
the ball nut includes a first axial end and a second axial end;
the first axial direction is from the first axial end toward the second axial end; and,
the first axial end, the reset spring, the retaining device, and the second axial end are in sequence in the first axial direction.

14. A ball screw, comprising:
a spindle;
a ball nut radially disposed around the spindle, axially displaceable with respect to the spindle, and including a first helical protrusion, the first helical protrusion defining a first helical groove in the ball nut;
a plurality of balls disposed in the first helical groove and in contact with the spindle;
a reset spring including a first portion located in the first helical groove and an end portion extending past the first helical groove in a first circumferential direction around an axis of rotation of the ball screw; and,
a retaining device directly connected to the ball nut and arranged to limit displacement of the end portion of the reset spring in a first axial direction parallel to the axis of rotation, wherein for a first circumferential position of the spindle around the axis of rotation, the reset spring urges the plurality of balls in a second axial direction, opposite the first axial direction, and wherein an entirety of the retaining device has an extent, in the first circumferential direction, greater than 90 degrees and less than 360 degrees.

15. A ball screw, comprising:
a spindle supported for rotation around an axis of rotation;
a ball nut radially disposed around the spindle, axially displaceable with respect to the spindle, and including a helical protrusion, the helical protrusion defining a helical groove in the ball nut and including an end forming a portion of the helical protrusion extending furthest in a first axial direction parallel to the axis of rotation;
a plurality of balls disposed in the helical groove and in contact with the spindle;
a reset spring located in the helical groove and including an end portion forming a portion of the reset spring extending furthest in the first axial direction, the end portion extending past the end of the helical groove in the first axial direction and including an end surface, the end surface facing at least partly in a first circumferential direction around the axis of rotation and directly engaged with the ball nut; and,
a retaining device directly connected to the ball nut, extending past the end of the helical protrusion in the first circumferential direction, and located past the end portion of the reset spring in the first axial direction, wherein the retaining device includes a first circumferential end facing at least partly in the first circumferential direction, and a second circumferential end facing at least partly in a second circumferential direction opposite the first circumferential direction, and the retaining device is preloaded with a force displacing the first circumferential end and the second circumferential end circumferentially away from each other.

16. The ball screw of claim 15, wherein an entirety of the retaining device is located past the helical protrusion in the first axial direction.

17. The ball screw of claim 15, wherein the retaining device is discontinuous in the first circumferential direction.

18. The ball screw of claim 15, wherein:
a hypothetical line passes through, in sequence and in a second axial direction, opposite the first axial direction, the retaining device and the end portion of the reset spring without passing through the helical protrusion; and, the hypothetical line passes through the helical protrusion after passing through the end portion of the reset spring.

19. The ball screw of claim 15, wherein the retaining device is arranged to limit displacement of the end portion of the reset spring in the first axial direction.

20. The ball screw of claim 15, wherein the retaining device is in constant direct contact with the ball nut.

* * * * *